United States Patent [19]
Kashihara et al.

[11] Patent Number: 5,386,302
[45] Date of Patent: Jan. 31, 1995

[54] IMAGE PROCESSING APPARATUS

[75] Inventors: Atsushi Kashihara, Hachioji; Takashi Kawana, Yokohama; Tetsuo Saito; Hiroshi Mano, both of Tokyo; Kiyoshi Kanaiwa, Kawasaki; Kaoru Seto, Chigasaki, all of Japan

[73] Assignee: Canon Kabushiki Kaisha, Tokyo, Japan

[21] Appl. No.: 157,432

[22] Filed: Nov. 26, 1993

Related U.S. Application Data

[63] Continuation of Ser. No. 689,554, Apr. 23, 1991, abandoned.

[30] Foreign Application Priority Data

Apr. 25, 1990 [JP] Japan .................................. 2-109329
Jan. 23, 1991 [JP] Japan .................................. 3-006273

[51] Int. Cl.6 .............................................. H04N 1/40
[52] U.S. Cl. ..................................... 358/448; 358/400; 358/401
[58] Field of Search ............... 358/400, 401, 409, 410, 358/412, 434, 435, 438, 439, 443, 445, 448, 452, 455, 456, 457, 458, 462, 465, 466, 467, 471, 474, 475, 476, 500

[56] References Cited
U.S. PATENT DOCUMENTS

| 4,468,704 | 8/1984 | Stoffel et al. | 358/466 |
| 4,698,688 | 10/1987 | Ochi et al. | 358/257 |
| 4,870,499 | 9/1989 | Suzuki | 358/456 |
| 4,899,225 | 2/1990 | Sasuga et al. | 358/448 |
| 4,926,248 | 5/1990 | Kobayashi et al. | 358/75 |
| 4,980,757 | 12/1990 | Nishigaki | 358/75 |

OTHER PUBLICATIONS

"System for Converting Resolution", in IBM Technical Disclosure Bulletin, vol. 31, No. 6, pp. 324–327 (Nov. 1988).

Primary Examiner—Edward L. Coles, Sr.
Assistant Examiner—Jerome Grant, II
Attorney, Agent, or Firm—Fitzpatrick, Cella, Harper & Scinto

[57] ABSTRACT

This image processing apparatus inputs multi-valued image data, generates first recording data based on the input data, adds together several of the multi-valued image data, generates second recording data based on the added data and selects either the first or the second recording data. The image processing apparatus selects the first recording data in areas corresponding to the several multi-valued image data when preset data are included in those multi-valued image data, and selects the second recording data in areas corresponding to the several multi-valued image data when preset data are not included in those multi-valued image data.

36 Claims, 14 Drawing Sheets

| SELECTOR INPUT A | L1 | L2 | L3 | L4 | L5 | L6 | L7 | L8 |
|---|---|---|---|---|---|---|---|---|
| MEMORY1 OUTPUT | — | — | L1 | L2 | L3 | L4 | L5 | L6 | L7 |
| SELECTOR INPUT B | — | — | L1 | L2 | L3 | L4 | L5 | L6 |
| SELECTOR OUTPUT Y | B(—) | A(L2) | B(L1) | A(L4) | B(L3) | A(L6) | B(L5) | A(L8) |
| ADDER OUTPUT | — | L1+L2 | | L3+L4 | | L5+L6 | | L7+L8 |

5+2+E+4=19H
→ PRINT PIXEL(a)
WITH DENSITY
CODE 19H

0+7+A+D=1EH
→ PRINT PIXEL(b)
WITH DENSITY
CODE 1EH

FIG. 5

| VD04 | VD03 | VD02 | VD01 | VD00 | DECIMAL | COMMENTS FOR CODE |
|------|------|------|------|------|---------|-------------------|
| 0 | 0 | 0 | 0 | 0 | 0 | DENSITY CODE DESIGNATING THE DENSITY OF PIXEL IN 300dpi |
| 0 | 0 | 0 | 0 | 1 | 1 | |
| 0 | 0 | 0 | 1 | 0 | 2 | |
| 0 | 0 | 0 | 1 | 1 | 3 | |
| 0 | 0 | 1 | 0 | 0 | 4 | |
| 0 | 0 | 1 | 0 | 1 | 5 | |
| 0 | 0 | 1 | 1 | 0 | 6 | |
| 0 | 0 | 1 | 1 | 1 | 7 | |
| 0 | 1 | 0 | 0 | 0 | 8 | |
| 0 | 1 | 0 | 0 | 1 | 9 | |
| 0 | 1 | 0 | 1 | 0 | 10 | |
| 0 | 1 | 0 | 1 | 1 | 11 | |
| 0 | 1 | 1 | 0 | 0 | 12 | |
| 0 | 1 | 1 | 0 | 1 | 13 | |
| 0 | 1 | 1 | 1 | 0 | 14 | |
| 0 | 1 | 1 | 1 | 1 | 15 | |
| 1 | 0 | 0 | 0 | 0 | 16 | |
| 1 | 0 | 0 | 0 | 1 | 17 | |
| 1 | 0 | 0 | 1 | 0 | 18 | |
| 1 | 0 | 0 | 1 | 1 | 19 | |
| 1 | 0 | 1 | 0 | 0 | 20 | |
| 1 | 0 | 1 | 0 | 1 | 21 | |
| 1 | 0 | 1 | 1 | 0 | 22 | |
| 1 | 0 | 1 | 1 | 1 | 23 | |
| 1 | 1 | 0 | 0 | 0 | 24 | |
| 1 | 1 | 0 | 0 | 1 | 25 | |
| 1 | 1 | 0 | 1 | 0 | 26 | |
| 1 | 1 | 0 | 1 | 1 | 27 | |
| 1 | 1 | 1 | 0 | 0 | 28 | |
| 1 | 1 | 1 | 0 | 1 | 29 | |
| 1 | 1 | 1 | 1 | 0 | 30 | 300dpi / BINARY "WHITE" |
| 1 | 1 | 1 | 1 | 1 | 31 | 300dpi / BINARY "BLACK" |

FIG. 9

| | | | | | | | | | |
|---|---|---|---|---|---|---|---|---|---|
| BUFFER 408 INPUT | L4 L3 L2 L1 | L5 L4 L3 L2 | L6 L5 L4 L3 | L7 L6 L5 L4 | L8 L7 L6 L5 | L9 L8 L7 L6 | L10 L9 L8 L7 | L11 L10 L9 L8 | L12 L11 L10 L9 | L13 L12 L11 L10 |
| BUFFER 409 INPUT | L3 L2 L1 — | L4 L3 L2 L1 | L5 L4 L3 L2 | L6 L5 L4 L3 | L7 L6 L5 L4 | L8 L7 L6 L5 | L9 L8 L7 L6 | L10 L9 L8 L7 | L11 L10 L9 L8 | L12 L11 L10 L9 |
| BUFFER 410 INPUT | L2 L1 — — | L3 L2 L1 — | L4 L3 L2 L1 | L5 L4 L3 L2 | L6 L5 L4 L3 | L7 L6 L5 L4 | L8 L7 L6 L5 | L9 L8 L7 L6 | L10 L9 L8 L7 | L11 L10 L9 L8 |
| BUFFER 411 INPUT | L1 — — — | L2 L1 — — | L3 L2 L1 — | L4 L3 L2 L1 | L5 L4 L3 L2 | L6 L5 L4 L3 | L7 L6 L5 L4 | L8 L7 L6 L5 | L9 L8 L7 L6 | L10 L9 L8 L7 |
| DECODER OUTPUT (AVAILABLE BUFFER) | Y0 (408) | Y1 (409) | Y2 (410) | Y3 (411) | Y0 (408) | Y1 (409) | Y2 (410) | Y3 (411) | Y0 (408) | Y1 (409) |
| ADDITION DATA | | L1+L2+L3+L4 | | | L5+L6+L7+L8 | | | L9+L10+L11+L12 | | |

2+1+0+1+1+1+2+3+3+3+2+1+0+0+2+3=19H
→PRINT 150dpi PIXEL WITH
  DENSITY CODE 19H

| VD02 | VD01 | VD00 | DECIMAL | COMMENTS FOR CODE |
|---|---|---|---|---|
| 0 | 0 | 0 | 0 | DENSITY CODE DESIGNATING PIXEL DENSITY IN 600dpi |
| 0 | 0 | 1 | 1 | |
| 0 | 1 | 0 | 2 | |
| 0 | 1 | 1 | 3 | |
| 1 | 0 | 0 | 4 | |
| 1 | 0 | 1 | 5 | |
| 1 | 1 | 0 | 6 | 600dpi / BINARY "WHITE" |
| 1 | 1 | 1 | 7 | 600dpi / BINARY "BLACK" |

IMAGE PROCESSING APPARATUS

This application is a continuation of application Ser. No. 07/689,554 filed Apr. 23, 1991, now abandoned.

BACKGROUND OF THE INVENTION

1. Field of the Invention

The present invention relates to an image processing apparatus used for recording, such as a laser beam printer, an ink jet printer etc., particularly an image processing apparatus which processes multi-valued images.

2. Related Background Art

In recent years, a recording apparatus employing electronic photography system such as a laser beam printer has come to be used widely as the output apparatus of the computer. These apparatus have many advantages such as high picture quality, low noise, etc. and particularly because of its high picture quality, it has constituted one of the factors contributing to the rapid expansion of the field of desk top publishing (DTP).

Laser beam printer 100 is composed of printer controller 101 and printer engine 102 as shown in FIG. 16. Printer controller 101 decomposes the code data transmitted from the host computer 103 into dot data, develops them on the bit map memory (not shown in the drawing) and transmits them to printer engine unit 102. Since the said bit map memory is binary memory which works on the principle of printing dot or not, for printing of the image such as the photograph of the laser beam printer they have widely used such method as to binarize the multi-valued signal by dither method etc. at host 103 side in order to obtain the desired gradation and then print them.

On the other hand, in recent years such method has also been proposed wherein printer controller 101 is provided with the multi-valued bit map memory, the multi-valued data developed on such multi-valued memory are transmitted to the printer engine unit 102, binarization processing such as density pattern processing, pulse width modulation of recorded pixel etc. is performed at the printer engine unit 102 and thus intermediate tone is printed out.

When a laser beam printer is taken for example, it is known that a preferred quality of image is obtained if plural number of dots are grouped into one multi-valued pixel and density of such multi-valued pixel is modulated into about 64 gradations, because of the characteristics of electronic photographing process.

However, in the aforesaid conventional method, when the printer controller 101 has the bit map memory of 6 bit with the resolution of printer engine unit 102, the memory capacity becomes 6 times that of the bit map memory of binary data and the apparatus becomes inevitably costly. It is also possible to have separately the bit map memory of 6 bit with the resolution of the said multi-valued pixel which groups plural number of dots and the bit map memory of one bit with the resolution of printer engine but in such case processing of image data is complicated and besides, due to the difference in resolution between binary data and multi-valued data, problems occur at the boundary of the two data. To prevent such problem, it is necessary to provide the binary/multi-value switching signal with the resolution of binary data and it accompanies the drawback to result in the increase of memory capacity.

When one bit is treated in multi-value for example in about 4 bit and such dots are coupled at controller 101 side, it is possible to obtain gradation while maintaining a relatively high resolution but optimization of the pattern of such coupling is difficult unless one has deep knowledge about the characteristics of the electronic photographing process of the printer.

SUMMARY OF THE INVENTION

An object of the present invention is to solve the aforesaid technical problems of the conventional system.

Another object of the present invention is to provide an image processing apparatus which prevents the increase of memory capacity and can output, at high quality, both the picture image which includes intermediate tone and the text image etc. which is made of binary data.

Still another object of the present invention is to provide an image processing apparatus which can obtain a high quality image without complicating the composition.

Still another object of the present invention is to provide an image processing apparatus which can output the intermediate tone image of high quality without taking into account the characteristics etc. of the printing apparatus in the processing.

The aforesaid objects, other objects and advantages of the present invention shall be clarified with reference to the detailed description of the preferred embodiments, drawings and claims, each of which follow hereinafter.

BRIEF DESCRIPTION OF THE DRAWINGS

FIG. 5 illustrate the meaning of the input data of embodiment 2.

FIG. 9 shows the input-output relation of data at various units.

DETAILED DESCRIPTION OF THE PREFERRED EMBODIMENTS

The preferred embodiments of the present invention are explained which reference to the drawings.

Embodiment 1

Figure 1:
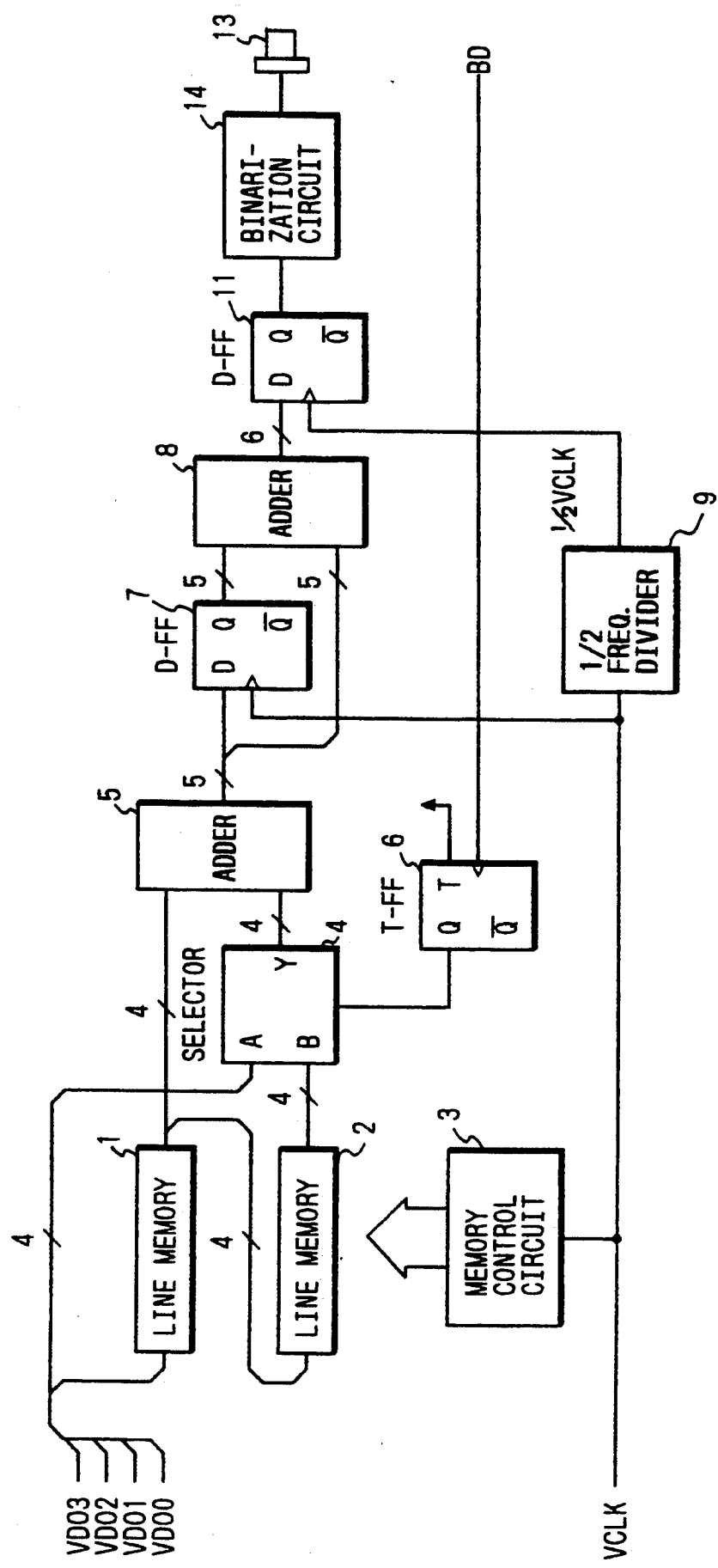
FIG. 1 is a block diagram which shows the composition of the recording apparatus of embodiment 1 of the present invention.

FIG. 1 shows the composition of embodiment 1 of the present invention. In this embodiment, reference is made the situation where two lines in main scanning direction and 2 columns in sub-scanning direction, in total 4, among 300 dpi (dot/inch) 4 bit density code data transmitted from printer controller (not shown in the drawing) are added and printed out as 6 bit data of 150 dpi. In the figure, elements 1 and 2 are the line memory to memorize one line amount in main scanning direction (hereinafter called input image data) of density code data in 300 dpi unit (hereinafter called input image data) which are composed of 4 bit namely VD03~VD00; 3 is the memory control circuit to control writing and read-out of the said memory; 4 is the selector to select and output either one of the two input terminals A and B; 5 is the adder of 4 bits; 6 is the T (toggle) flip-flop (T-FF); 7 is the 5 bit D flip-flop (D-FF); 8 is the 5 bit adder; 9 is ½ freq. divider circuit; 11 is the 6 bit D flip-flop (D-FF); 14 is binarized circuit and 13 is the semiconductor laser.

Figures 2, 3:
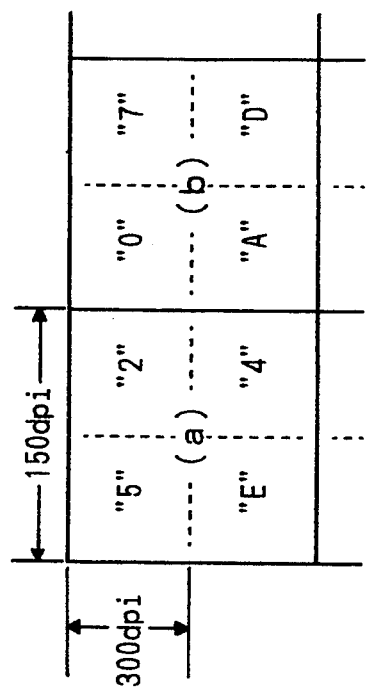
FIG. 2 shows the input-output relation of the data at various units of FIG. 1.
FIG. 3 shows the relation between the pixel and the input image data of embodiment 1.

Performance of the system is explained in reference to drawing 1. A delay of one line amount in main scanning direction is produced respectively by line memories 1 and 2 as for the said input image data VD03~VD00. That is, the image data of the first one line is entered into line memory one after another. Simultaneously with the input of the data of the following second line, the data of the first line already entered in line memory 1 are read-out of line memory 1 and the data of the second line are entered in the same address as that of said read-out data. Further, the data of the first line read out as aforesaid are entered into the same address of the line memory 2. By the actions as described above, the input image data, data read-out from line memory 1 and data read-out from line memory 2 become the output of the image data of three lines which are synchronized and continuous in the main scanning direction. The aforesaid line memories 1 and 2 are controlled by the memory control circuit 3. Along these image data, input image data are entered into the input terminal A of the selector 4, the image data read out of the line memory 1 are entered into the input terminal of one of the input terminals of the adder 5 and the image data read out of the line memory 2 are entered into the input terminal B of selector 4. At selector 4, whenever the horizontal synch. signal BD is entered, the image data of input terminals A and B are switchingly output as selective output Y and such output Y is input into the other input terminal of the said adder 5. By the aforesaid composition, at the adder circuit 5, the data of 5 bit are output as the sum of 2 line image data (4 bit) adjacent in sub-scanning direction. These 5 bit addition data are output as the same data of two lines each. When input image data are numbered $L_1, L_2, L_3$ ... from the first line, their input-output relations are shown in FIG. 2. The aforesaid addition data and the addition data of 5 bit each having been transmitted for each one clock pulse amount of transfer clock VCLK by D flip-flop 7 are added at adder 8 to become the addition data of 6 bit. The said 6 bit addition data are sampled by D flip-flop 11 at each ½ VCLK which is obtained by ½ freq. division of the said VCLK signal. Thus sampled 6 bit data are used as the final multi-valued image data of 150 dpi. These data are the results of addition of 4 data i.e., 2 dot in main scanning direction×2 dot in sub-scanning direction of the 300 dpi, 4 bit input image data.

Next the relation between the said input image data and the 150 dpi 6 bit image data which are obtained by addition is explained in reference to the concrete example represented by FIG. 3. For example, when it is assumed that the data at the first line of input image data are 5H, 2H, 0H, 7H ... by this order (H indicates that it is hexadecimal digit) and those at the second line are EH, 4H, AH, DH ... by this order, the first data of 150 dpi are 5H+2H+EH+4H=19H and the second data of 150 dpi unit are 0H+7H+AH+DH=1EH. Multi-valued data for the pixel (a) of 150 dpi unit which combines 4 pixels of 300 dpi become 19H and likewise multi-valued data corresponding to the pixel (b) of 150 dpi unit become 1EH.

Coming back to FIG. 1, the said 6 bit multi-value data are binarized by binarization circuit 14 (for example pulse width modulation circuit) and drives semiconductor laser as the laser driving signal and printing is performed by the well known electronic photography process.

Here, reference has been made to the situation where 2 dot in main scanning direction×2 dot in sub-scanning direction in total 4 dot of 300 dpi 4 bit multi-valued data are combined and it is printed out as 150 dpi 6 bit multi-valued data. The embodiment is not limited thereto; for example, the said multi-valued data may be so combined that 4 dots in main scanning direction only are combined to make them 6 bit data of 75 dpi in the main scanning direction and 300 dpi in sub-scanning direction. In such a case, the line memory is unnecessary and the circuit composition may be simplified. While in this situation, a laser beam printer has been described, the present invention may also be applied to other systems as long as it is the recording apparatus in which multi-valued data can be input.

Embodiment 2

Figure 4:
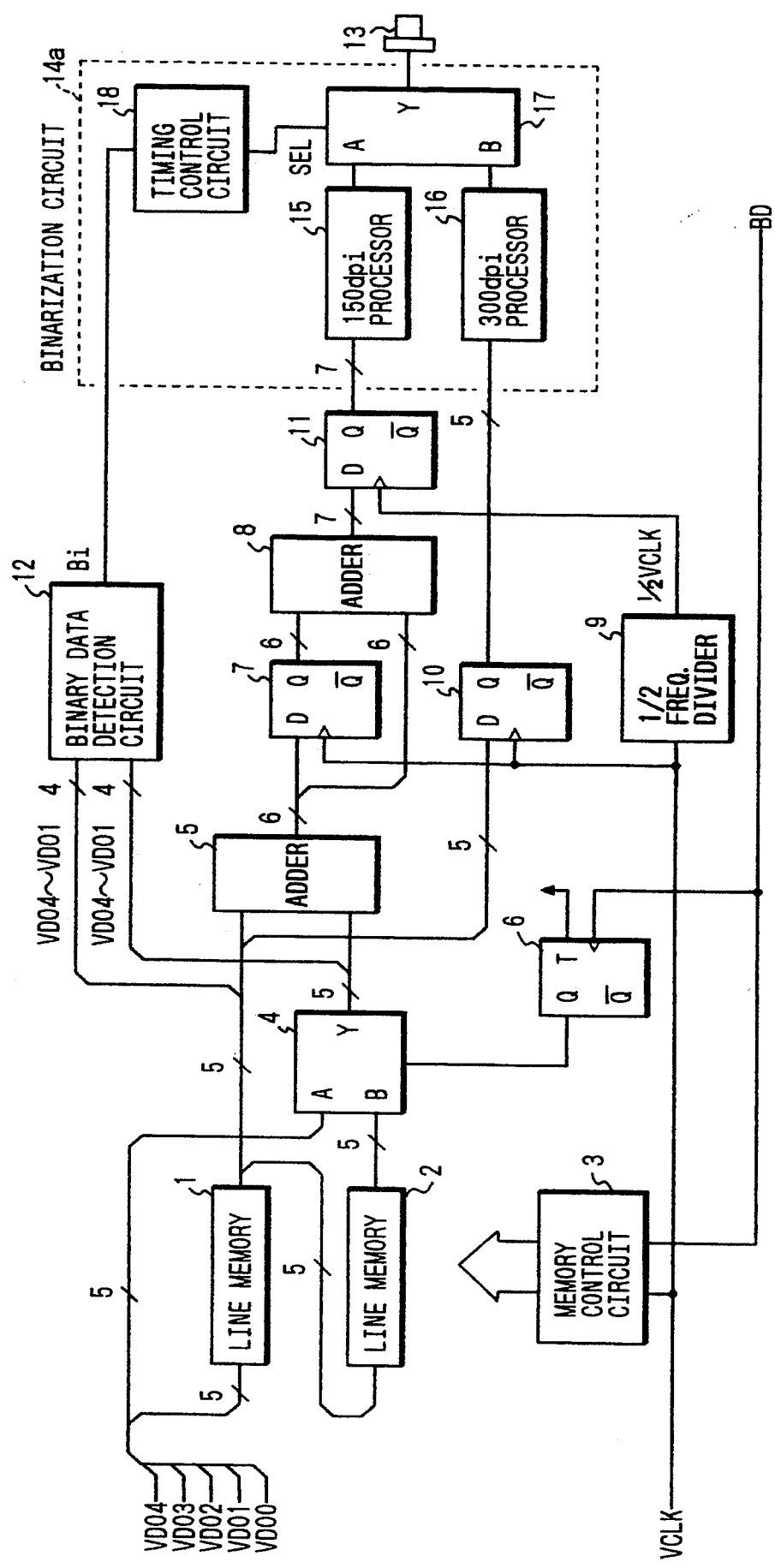
FIG. 4 is a block diagram which shows the composition of the recording apparatus of the embodiment 2 of the present invention.

In this embodiment, the density code data of 300 dpi (dot/inch) 5 bit transmitted from the printer controller (not shown in the drawing) are printed out in 150 dpi 7 bit data by adding 4 dot, i.e., 2 dot in main scanning direction×2 dot in sub-scanning direction. Here, it is possible to change-over the printing of 150 dpi and printing of 300 dpi. In FIG. 4, the element having the same function to that of FIG. 1 is given the same reference code.

In the figure, 1 and 2 are both the line memory to memorize one line amount in main scanning direction of density code data (hereinafter called input image data) of 300 dpi unit which is composed of 5 bit of VD04~VD00, 3 is the memory control circuit to control writing and read-out of line memory 1 and 2, 4 is the selector to select and output one of the two inputs A and B, 5 is the 5 bit adder, 6 is T (toggle) flip-flop, 7 is 6 bit D flip-flop, 8 is adder of 6 bit, 9 is ½ freq. divider, 10 and 11 are respectively the 5 bit and 7 bit D flip-flop, 12 is the binary data detection circuit, 13 is semiconductor laser, 14 is binarization circuit which is composed of 150 dpi processor 15, 300 dpi processor 16, selector 17 and timing control circuit 18.

The performance of the apparatus having such composition is now explained.

Input image data composed of 5 bit of VD04~VD00 are basically the 5 bit density code which uses VD04 as MSB as shown in FIG. 5 and its density code designates the density of 300 dpi pixel. However when the upper 4 bits of the said density code are all "1", i.e., they are "30" and "31" in the decimal digit, they have special meaning and when the code is "30", it indicates that the pixel in question is binary "white" and when density code is "31", the pixel in question is binary black.

As shown in the figure, input image data VD04~VD00 are delayed by one line amount in the main scanning direction by line memories 1 and 2. In other words, after the entry of the image data of the first line into the line memory 1 one after another, simultaneously with the input of the succeeding second line data, the first data already entered are read out from the line memory 1 and the first data of the second line are entered in the same address of the data having been read out. Furthermore, the first data of the first line simultaneously read out are entered into the first address of the line memory 2.

As described above, the input image data and the data read out of line memories 1 and 2 become the continuous 3 line amount image data which are synchronized in main scanning direction.

Here the line memories 1 and 2 are controlled by the memory control circuit 3. Out of these data, the most recent input image data are input into the A input of selector 4, the data read out of line memory 1 are entered into one of the input terminals of adder 5 and the data read out of line memory 2 are entered into B input of selector 4. At selector 4, whenever the horizontal synchronizing signal BD is entered from the printer, selection output Y is switched over and its output Y is input into the other input terminal of the said adder 5. By the aforesaid input, at the adder 5, 6 bit addition data are output as the sum of 2 line image data (5 bit) which are adjacent in sub-scanning direction. These 6 bit addition data are output in the same data for 2 line each.

When input image data are numbered $L_1$, $L_2$, $L_3$ ... from the first line, their input-output relations are same as those of embodiment 1 shown in FIG. 3.

At the adder 8, the said addition data are added with the addition image data delayed by one clock pulse of transfer clock VCLK by D flip-flop 7, to output the 7 bit addition data. The said 7 bit addition data are sampled at the succeeding D flip-flop 11 at every $\frac{1}{2}$ VCLK which is $\frac{1}{2}$ freq. division of the said VCLK signal. Thus sampled 7 bit data become the final 150 dpi multi-valued image data. These data are obtained by addition of 4 input image data of 300 dpi, 5 bit, i.e., 2 in main scanning direction×2 in sub-scanning direction and they are input into the 150 dpi processor 15 of the succeeding binarization circuit 14a, where binarization processing of 150 dpi unit is conducted (for example, pulse width modulation processing to change the driving pulse width of the laser according to the density level) and its output is entered into A input of selector 17. By such processing, 117 level gradation can be designated at 150 dpi unit.

On the other hand, the output data of the line memory 1 (which becomes the multi-valued image data of the said printing line) are input as they are into 300 dpi processor 16 of binarization circuit 14a via 5 bit D flip-flop 10, where 300 dpi binarization processing is conducted and its output is entered into the B input of selector 17. During this processing, it is possible to designate 30 level multi-valued gradation in 300 dpi or designate binary white or black. However because of the characteristics of the aforesaid electronic photography process, the gradation which is actually expressed is inferior to that obtained by the aforesaid 150 dpi processing.

Figure 6:
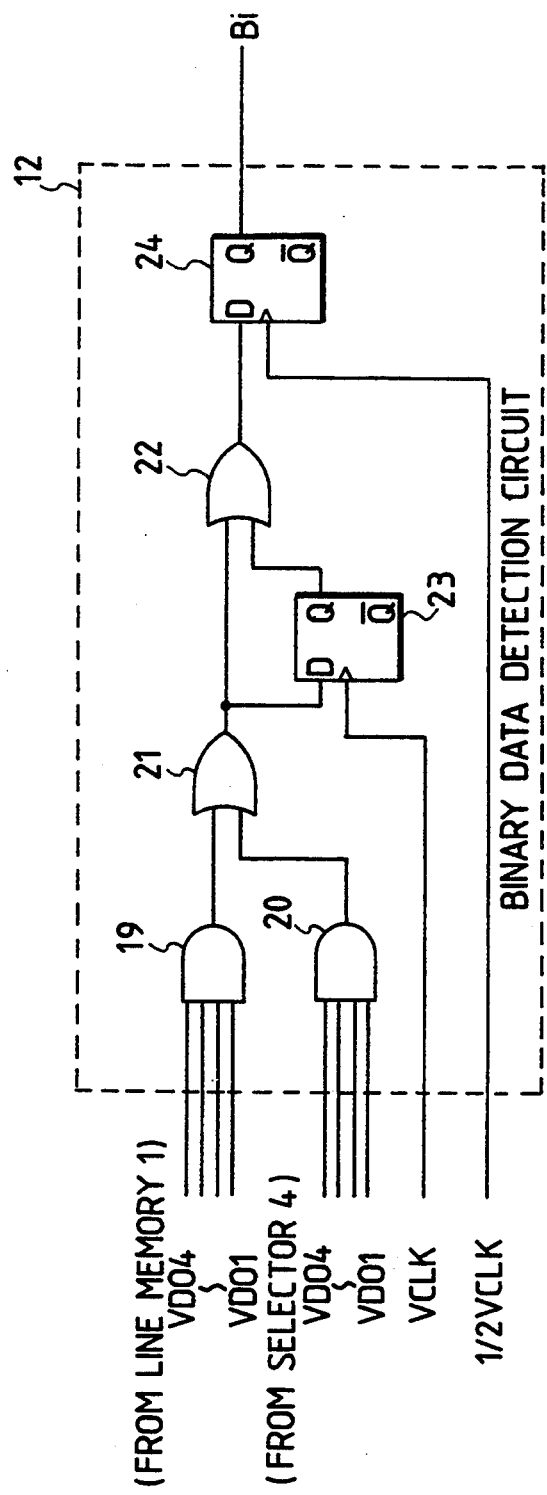
FIG. 6 shows the binary data detection circuit of embodiment 2.

The upper 4 bit each of the data coming from line memory 1 and selector 4 are input into the binarized data detection circuit 12. The functions to detect whether the binary data are included in the 150 dpi pixel obtained by combination of 4 data in 300 dpi and it is maybe constructed as shown in FIG. 6. In this figure, the upper 4 bit VD04~VD01 of the output data from line memory 1 and the upper 4 bit VD04~VD01 of the output data from selector are entered into the 4 input AND circuits 19 and 20 and the output from each AND circuits 19 and 20 are logically summed at OR circuit 21. In this way, it can be detected that among 4 300 dpi pixels to compose 150 dpi unit pixel, either of the two pixels adjacent in sub-scanning direction is a binary pixel. Output data from OR circuit 21 are logically summed with the pixels adjacent in main scanning direction by OR circuit 22 and sampled by D flip-flop at every $\frac{1}{2}$ VCLK to become the binary data detection signal Bi.

Because of the above composition Bi signal becomes "1" during the period of data output of 150 dpi pixel, should there be even one binary data among the 4 pixels of 300 dpi which compose 150 dpi pixel. Bi signal is synchronized with the timing of 150 dpi and 300 dpi processing signals by the timing control circuit of binarization circuit 14a and it becomes the selection signal of selector 17. At this selector 17, input A is selected when selection signal is "0" and input B is selected when selection signal is "1" for output. This selector output becomes the driving signal of the laser to drive laser 13 and thereafter printing is executed by the wellknown electronic photography process.

Figure 7:
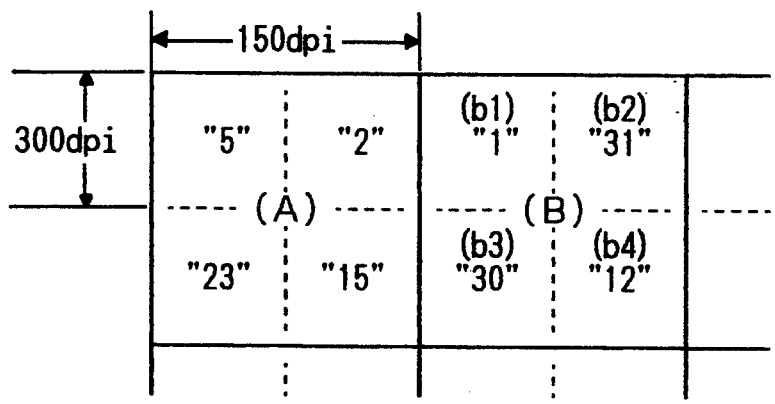
FIG. 7 shows the relation between the input image data and the pixel in embodiment 2.

The relation between the aforesaid input image data and the actual printing pixel shall be explained hereunder with concrete example in reference to FIG. 7.

Assuming that the first line data of input image data are 5, 2, 1, 31 ... in decimal digit and the data of the second line are 23, 15, 30, 12 ... by this order, all the 300 dpi pixel data which compose the first 150 dpi pixel (A) are multi-valued and they are so processed that 4 data are added and 150 dpi pixel (A) is printed at the density level of 5+2+23+15=45/117. On the other hand, among the data which compose the second 150 dpi pixel exist the binary data. In such case it is so processed that data addition is not done but each pixel is printed in 300 dpi unit. In other words, pixel (b1) is printed at the density level of 1/30, pixel (b2) is printed in binary "black", pixel (b3) is printed in binary "white" and pixel (b4) is printed with density level of 12/30.

By such processing, multi-valued image data can be printed in 300 dpi and 4 bit input data are printed in 150 dpi by adding 4 data namely 2 main scanning×2 sub-scanning and thus it is possible to print the image of photograph etc. with high gradation and on the other hand, since binary data can be printed dot by dot in 300 dpi, a high resolution is also obtained. Furthermore, at the boundary of the aforesaid multi-value data and binary value data, no addition is made but multi-value expression is made in 300 dpi and thus degeneration of picture quality at boundary can be minimized.

As explained above, according to the present embodiment, multi-valued image data transmitted from printer controller are added and by using them as the density code data for printing, it is possible to minimize the increase of image memory possessed by the printer controller and a high quality printing of intermediate gradation can be effected without using care about the process characteristics of the printer engine at the printer control side.

In addition, when input data are the special code, they are regarded as binary data and the system is switched over to binarization processing and therefore it is unnecessary to have the bit exclusively used for the binary/multi-value change-over and all the bits are effectively utilized for image data and a high quality image is obtained for both image and text.

In the present embodiment, explanation has been made on the case where 4 multi-valued data in 300 dpi, 5 bit, namely, 2 main scanning direction×2 sub-scanning direction are combined to obtain multi-value data of 150 dpi, 7 bit and it is printed but the present invention is not limited thereto but it may be so arranged that 4 multi-valued data in main scanning direction only are combined to obtain 7 bit data of 75 dpi in main scanning direction and 300 dpi in sub-scanning direction. In this case, line memory is unnecessary and circuit composition becomes simpler.

In the present embodiment, reference has been made to the situation of a laser beam printer but the present invention may be applied to other systems as long as it is the recording equipment which accepts the input of multi-valued data.

Embodiment 3

Figure 8:
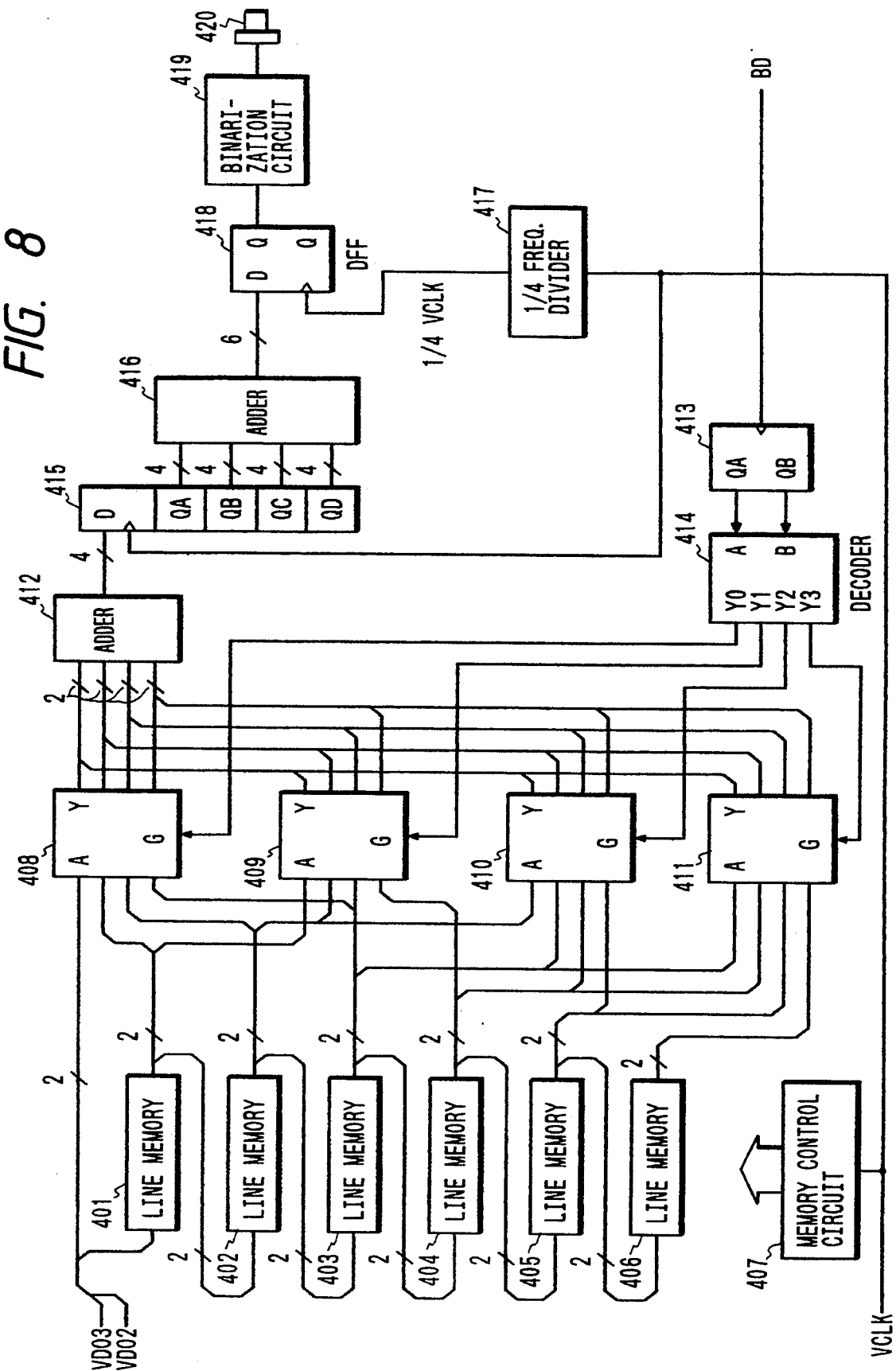
FIG. 8 is a block diagram which shows the composition of the recording apparatus of the embodiment 3 of the present invention.

FIG. 8 is the composition drawing of the embodiment 3 of the present invention. In this embodiment, explanation shall be made on the case where resolution of printer engine is 600 dpi, printer controller has bit map memory of 600 dpi, 2 bit and 16 dots of the said 600 dpi 2 bits image data of 4 dot in main scanning direction and 4 dot in sub-scanning direction are added to obtain 150 dpi, 6 bit data and they are printed.

In the figure, 401~406 are the line memory to memorize one line amount in the main scanning direction of 600 dpi image data composed of 2 bit of VD03 and VD02; 407 is the memory control circuit to control the aforesaid memory; 408~411 are respectively the 3-state buffer of 8 bit; 412 is the adder to add 4 input data of 2 bit each and output the result of 4 bit data; 413 is 2 bit counter; 414 is 2 to 4 decoder; 415 is the serial-in-parallel-out 4 bit shift register; 416 is the adder to add 4 input data of 4 bit each and output the resulted 6 bit data; 417 is ¼ freq. divider circuit; 418 is 6 bit D flip-flop; 419 is binarization circuit and 420 is the semiconductor laser.

The performance of the memory is explained hereunder in reference to FIG. 2. As in the case of embodiment 1 above, input image data are synchronized in main scanning direction by passing through the memories 401~406. Among these image data, the most recent line data are entered into the buffer 408 and 4 line data shifted by one line forward of the said 4 line data are entered respectively in buffer 409, 410 and 411. The output Y of the said buffer 408~411 are shorted respectively as shown by the figure but since each output is 3-state short output, in reality, only one is made available by the decoder 414. The output of decoder 414 is determined by the count data QA and QB of 2 bit counter 413 which is counted up by BD signal. The continuous 4 line image data which are output by the aforesaid effective buffer are added by the adder 412 to become 4 bit data. By the aforesaid performance, the continuous 4 line data in sub-scanning direction are added. Since these data are switched over at every 4 main scanning lines, the same data are repeated during the continuous 4 lines. When the input image data are named $L_1$, $L_2$, $L_3$ . . . from the first line, the relation between these input and output is as shown in FIG. 9.

Figures 10, 12:
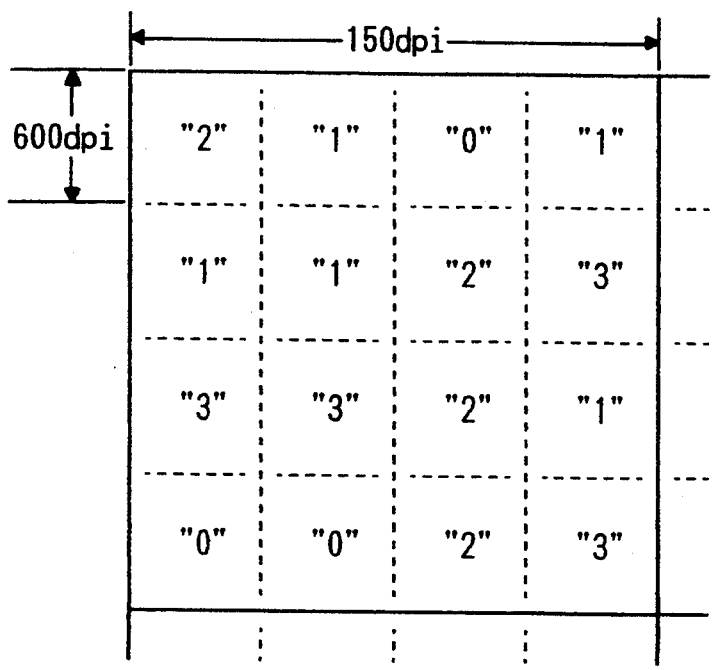
FIG. 10 shows the relations between input-output image data and the pixels of embodiment 3.
FIG. 12 shows the meaning of the input data at embodiment 4.

The added data in the said sub-scanning direction are input in the shift register 415. The shift register 415 is shifted by the said VCLK signal and the shift output QA~QD which are 4 bit each are added by the adder 416 to become 6 bit data. In this way 4 bit data are added also in the main scanning direction. Such addition output are sampled by flip-flop 418 by ¼ VCLK signal which is obtained by dividing VCLK signal by ¼ freq. divider 417 and entered into binarized circuit 419. The performance thereafter is same as that of embodiment 1. FIG. 10 shows the relation between the 600 dpi 2 bit input image data and 150 dpi addition data.

Embodiment 4

Figure 11:
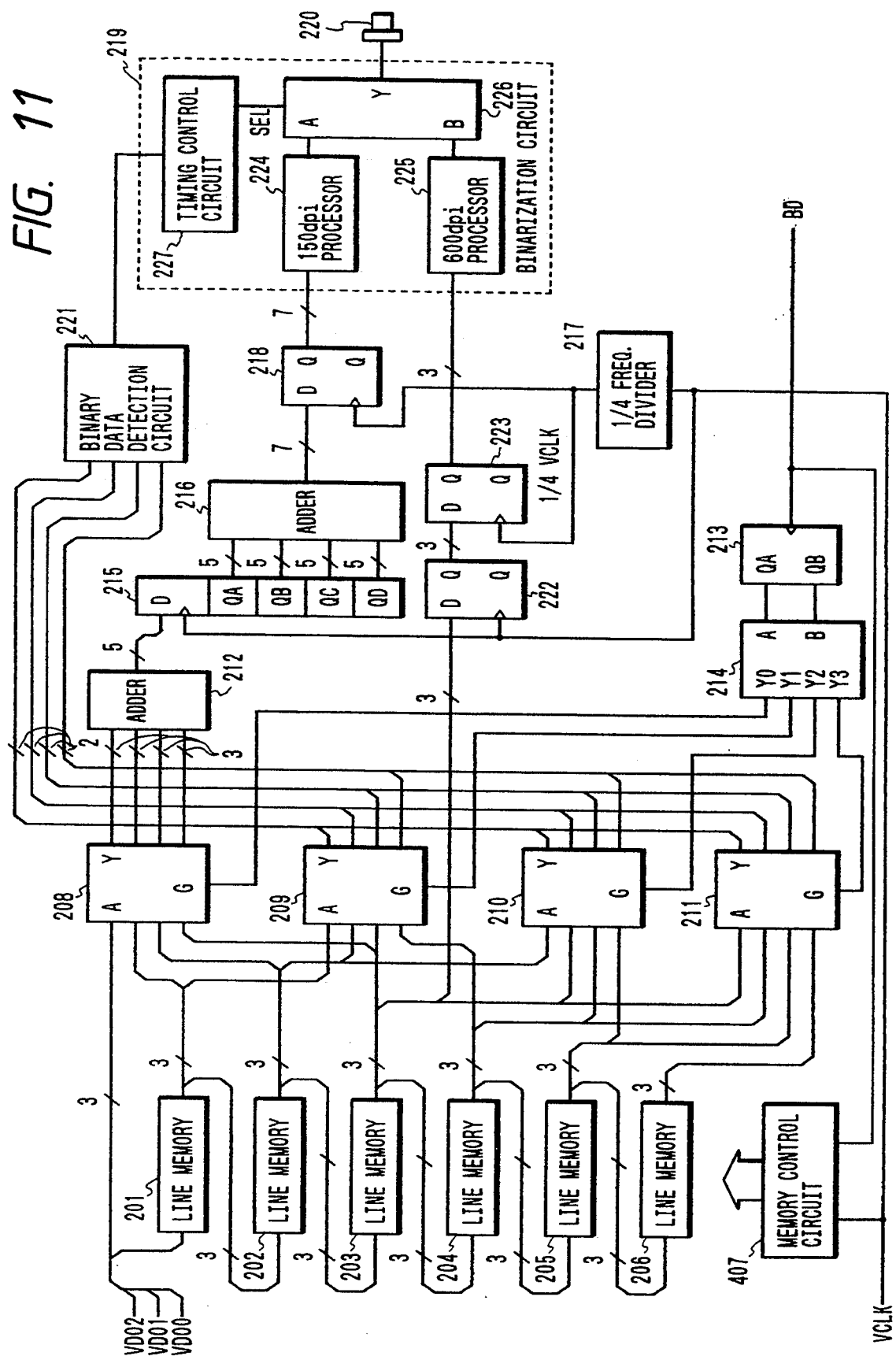
FIG. 11 is a block diagram which shows the composition of recording apparatus of embodiment 4 of the present invention.

Embodiment 4 of the present invention is explained in reference to FIG. 11.

In this embodiment, explanation shall be made on the case where resolution at the printer engine unit is 600 dpi, the printer controller not shown in the drawing has the bit map memory of 600 dpi and 16 image data of 600 dpi, 3 bit transmitted from the printer controller i.e., 4 in main scanning direction×4 in sub-scanning direction are added and they are printed as 150 dpi 7 bit data. In the case of this embodiment, based on 3 bit image data, printing in 600 dpi and printing in 150 dpi are switchingly conducted.

In the figure, 201~206 are the line memory to memorize one line amount each of 3 bit image data VD02~VD00 in 600 dpi in main scanning direction; 207 is the memory control circuit to control each memory of 201~206; 208~211 are 3-state buffer of 12 bit each; 212 is the adder to add 4 input data of 3 bit each and output the result of 5 bit data; 213 is the serial-in-parallel-out 4×5 bit shift register; 216 is the adder to add 4 input data of 5 bit each and output the result of 7 bit data; 217 is ¼ freq. divider circuit; 218 is 7 bit D flip-flop, 219 is binarization circuit; 220 is semiconductor laser; 212 is binary data detection circuit; 222 and 223 are 3 bit D flip-flop.

Input image data in this embodiment is made of 3 bit of VD02~VD00 but the meaning of the code of these 3 bit is shown in FIG. 12. Basically, it is the 3 bit density code to use VD02 as MSB and by this code, the density of the pixel in 600 dpi is designated. However when the upper 2 bit of the code are both "1", in other words, it is "6" and "7" in decimal digit, it means that the data are binary data and it indicates binary "white" when it is "6" and binary "black" when it is "7".

The performance of the present embodiment is explained hereunder. As in the foregoing embodiment, input image data are synchronized in the main scanning direction by passing through the line memory 201~206. Out of these image data, the most recent 4 line data are entered into the buffer 208 and 4 line data each shifted by one line forward of them are entered respectively in buffer 209, 210 and 211. Output Y of buffer 208~211 are respectively shorted as shown in the drawing but since each output is the 3 state output, in reality only one is made effective by decoder 214. Here the output of decoder 214 is determined by the count data QA and QB of 2 bit counter 213 which is counted up by BD signal. As the result, continuous 4 line image data which are output by the effective buffer are added at the adder 212 to become 5 bit data.

By the aforesaid performance, continuous 4 line data in sub-scanning direction are added. Since these data are changed over at every 4 lines of main scanning, the same data are repeated during the continuous 4 lines. In other words, when input image data are named $L_1$, $L_2$, $L_3$ . . . from the first line, the relation between their input and output is same as that of the aforesaid embodiment (FIG. 9).

The aforesaid addition data in sub-scanning direction are input in shift register 215 and at the shift register 215, they are shifted by VCLK signal and shift output QA~QD of 5 bit each are added by the adder 416 to become 7 bit data. It means that 4 data amount are added also in main scanning direction. Such addition output are sampled at flip-flop 218 by ¼ VCLK signal which is obtained by dividing the VCLK signal by ¼ freq. dividing circuit 217 and they are entered into the 150 dpi processor 224 of binarization circuit 219. There, binarization in 150 dpi is conducted and the result is input into the A input of selector 226. By such processing, 81 level gradation designation in 150 dpi can be done.

On the other hand, the output data of line memory 203 which becomes the printing line in question are entered into the 600 dpi processor 225 of binarization circuit 219 via D flip-flop 222 and 223 and the processed signals are entered into B input of selector 226. By such processing, it is possible to do multi-value gradation designation of 6 level or designation of binary white or binary black in 600 dpi.

Figure 13:
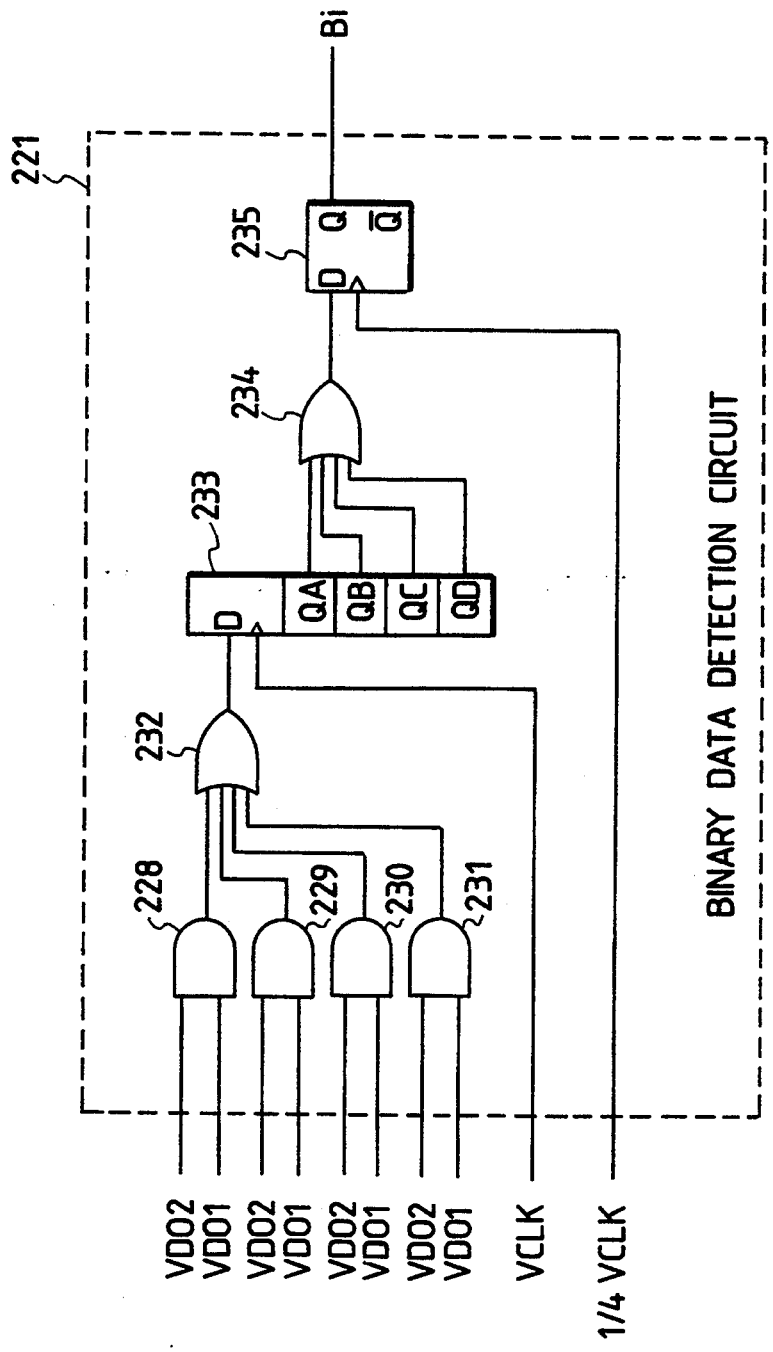
FIG. 13 shows the binary data detection circuit of embodiment 4.

Furthermore, the upper 2 bit each of 4 line image data in 600 dpi which compose 150 dpi pixel are entered into the binary data detection circuit 221. This binary data detection circuit 221 is so composed, for example, as shown in FIG. 13 and if there should be even one binary data among 16 data of 600 dpi which compose 150 dpi pixel, the binary designation signal Bi becomes "1" during the period of output of 16 data. This Bi signal becomes the selection signal of selector 226 via the timing control circuit 227 in the binarization circuit 219 and selects A input when the said signal is "0" and B input when the signal is "1". By such selection output, laser 220 is driven and printing is executed.

As explained above, according to this embodiment, it is possible to handle binary data in 600 dpi and therefore printing of higher quality is obtained.

Embodiment 5

Figure 14:
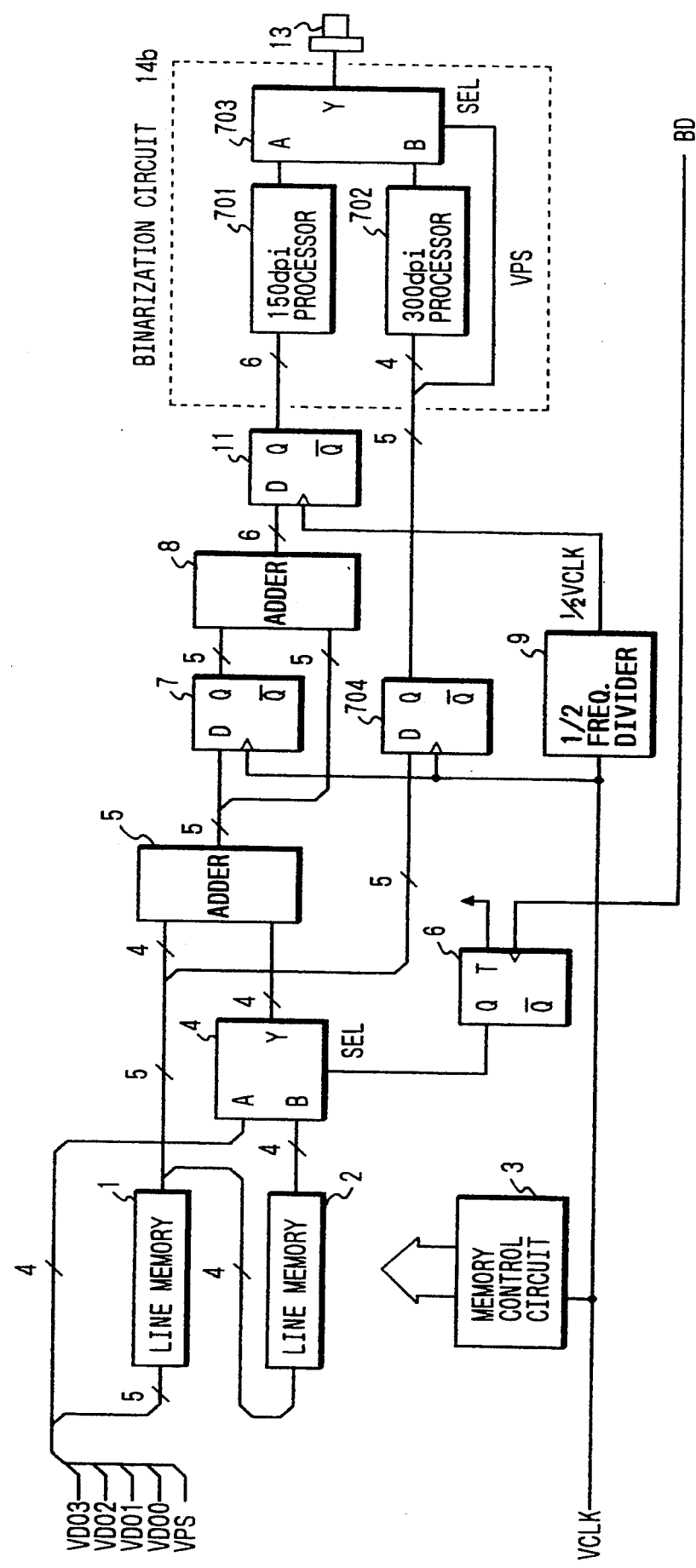
FIG. 14 shows the composition of the recording apparatus of embodiment 5 of the present invention.

FIG. 14 is the block diagram of the present embodiment. The elements having the same function as those of the aforesaid FIG. 1 are given the same code number and explanations thereof are omitted.

In the present embodiment, pixel selection signal VPS is used as the signal to change over the said picture image and text image. This VPS signal is the signal to indicate whether the 4 bit density code data VD03~VD00 are the data of picture image or text image and it is input together with the said code data. Therefore the input image data become 5 bit.

Hereunder is explained its performance. The basic performance is same as that of the aforesaid embodiment 1. That is, the 300 dpi 4 bit density code data are added for two bit each in sub-scanning direction by adder 5 and in main-scanning direction by adder 8, binarized at 150 dpi processor 701 of binarization circuit 14b as 150 dpi 6 bit density data and thus binarized signal is input into one of the two input terminals of selector 703.

On the other hand, line memory 1 memorizes the 5 bit input image data including the said pixel selection signal VPS and its output data are entered into the adder circuit 5 as explained above and via 5 bit D flip-flop 704, they are entered as they are into the binary circuit 14b. Out of these, the 4 bit density code data VD03~VD00 are binarized in 300 dpi at 300 dpi processor 702 and entered into the other input terminal of the said selector 703. Pixel selection signal VPS is used as the selection signal of selector 703. That is for the data designated as picture image by VPS signal, the selector 703 selects the signal having been given the said 150 dpi processing and for the data designated as text image by VPS signal, the signal having been given 300 dpi processing is selected by selector 703 and such selection output becomes the laser driving signal.

By the above processing, picture such as photograph is handled as 150 dpi 6 bit data and intermediate tone printing with high gradation can be executed, while the text image such as character, diagram etc. are handled as 300 dpi 4 data and thus the printing with high resolution can be obtained, resulting in the printing of high quality image for both picture and text appearing on the same page.

In this embodiment, even when controller side has no memory in terms of VPS signal, it is possible to obtain the effect close to the said embodiment if it is assumed that the case when density code of line memory 1 are all "1" or all "0" represents the case when the data are for the text image.

In this embodiment, explanation has been made of the case when resolution of printer engine is 300 dpi, but it is evident that the case when resolution of printer engine is 600 dpi can be similarly realized by applying the said embodiment 3.

Embodiment 6

Figure 15:
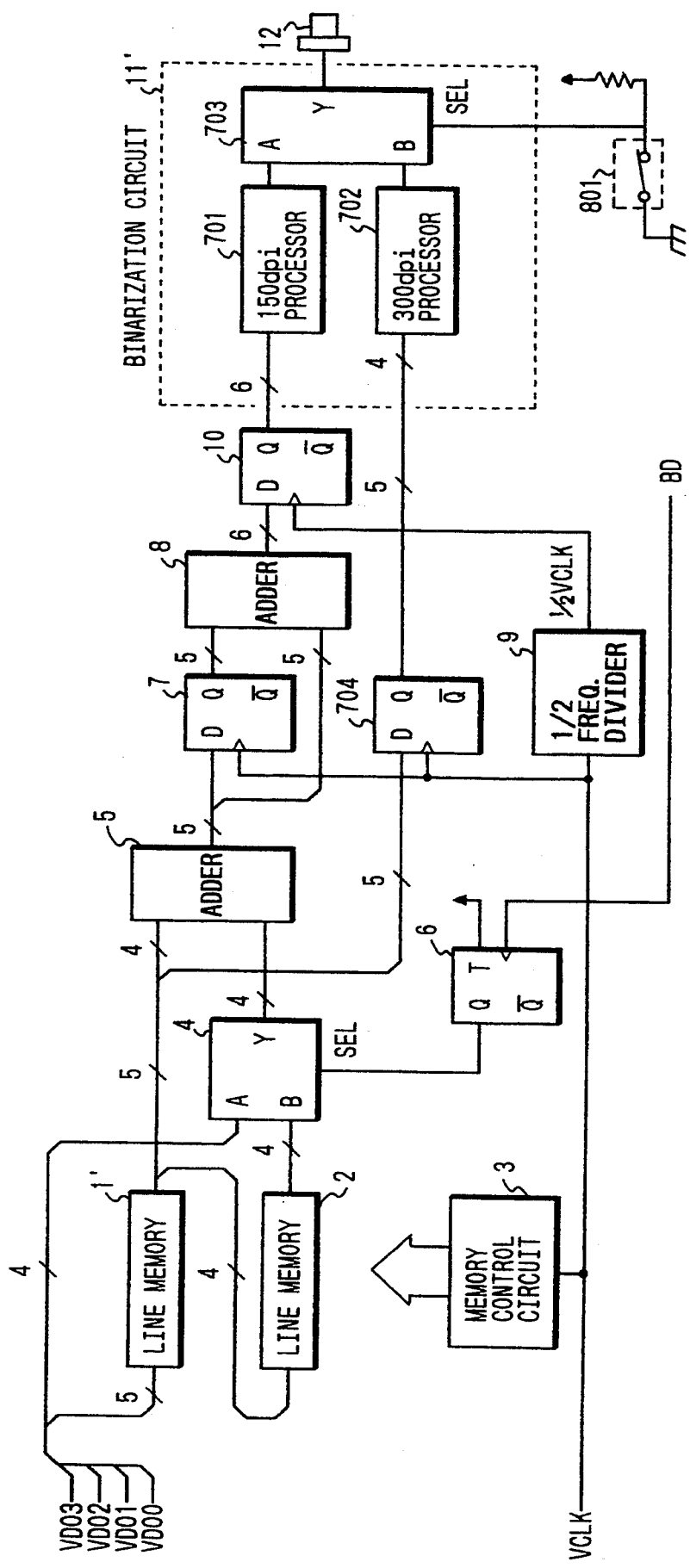
FIG. 15 shows the composition of the recording apparatus of embodiment 6 of the present invention.
Figure 16:
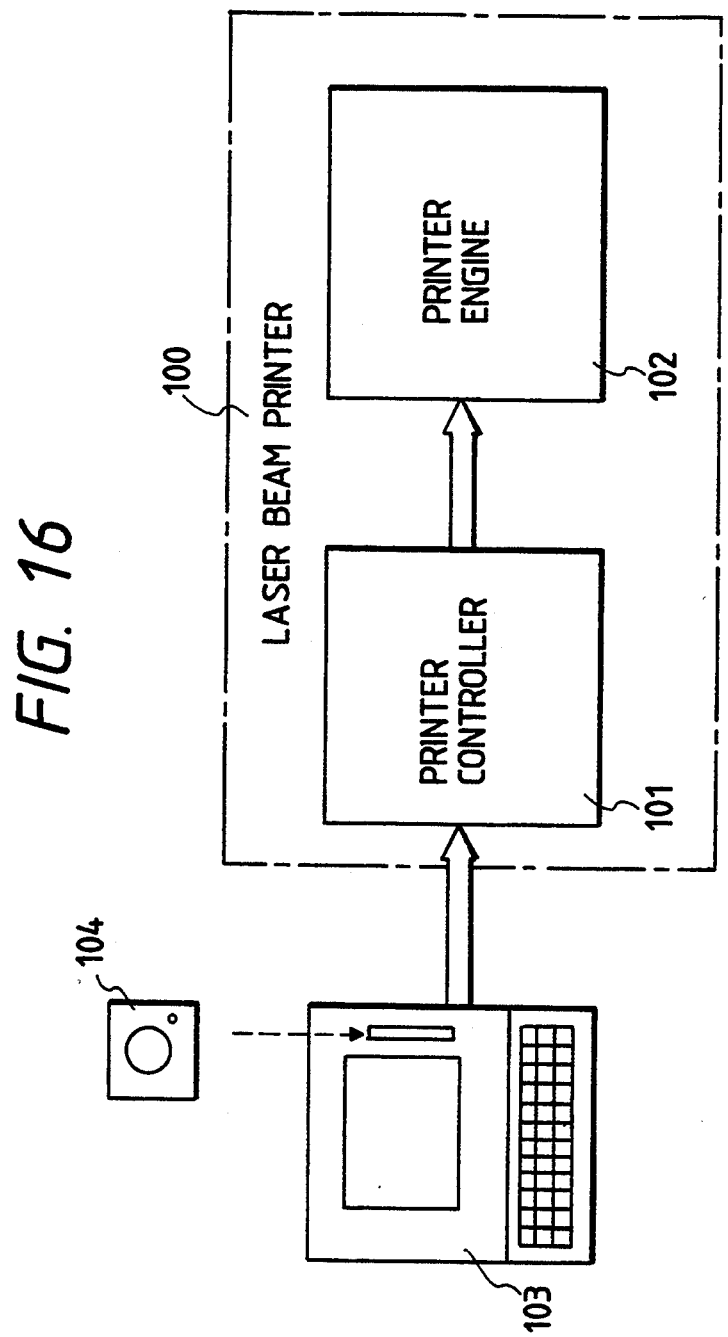
FIG. 16 shows the schematic composition of the laser beam printer in general.

FIG. 15 is the block diagram of the embodiment 6 of the present invention.

This embodiment is the simplified version of embodiment 5 and therefore explanation shall be omitted for the composition and performance which overlap with those of embodiment 5.

In the case of the said embodiment 5, explanation has been made for the case where image and text are switched over by pixel selection signal VPS for every one bit but in the case of this embodiment, this switch-over is executed by the switch 801 provided at outside. Therefore the switch-over can not be done prior to the end of the page but it has such advantage that it is unnecessary to be always conscious about the switch-over of picture and text. Instead of switch 801, the command from the printer controller may also be used.

What is claimed is:

1. An image processing apparatus comprising:
    input means to input multi-valued image data;
    addition means to add multi-valued image data of a plural number of pixels input by said input means, thereby to obtain image data for one pixel;
    means to output the image data which are the results of said addition, a first pulse width modulator which generates a pulse width modulation signal having a pulse width corresponding to a value of the multi-valued image data input by the input means, and second pulse width modulator which generates a pulse width modulation signal having a pulse width corresponding to a value of the image data which is the result of addition by said addition means.

2. An image processing apparatus according to claim 1, wherein said input means enters the multi-valued image data transmitted in synchronization with a first clock signal, wherein said apparatus further comprises a frequency divider circuit which divides the first clock signal and generates a second clock signal, and wherein said output means outputs the image data in synchronization with the second clock signal.

3. An image processing apparatus according to claim 1, further comprising:

selection means to select either of the multi-valued image data input by said input means or the image data given as the result of addition by said addition means, wherein said output means outputs the image data selected by said selection means.

4. An image processing apparatus according to claim 3, further comprising switching means for switching a mode of selection by said selection means at each page.

5. An image processing apparatus according to claim 3, wherein said input means inputs a selection signal together with the image data, and said selection means switches over a mode of selection at each pixel, based on the selection signal.

6. An image processing apparatus according to claim 3, wherein said input means inputs the multi-valued pixel data transmitted in synchronization with a first clock signal, wherein said apparatus further comprises a frequency dividing circuit which divides the first clock signal and generates a second clock signal, and wherein said output means outputs image data in synchronization with either of the first clock signal or the second clock signal corresponding to a mode of selection of said selection means.

7. An image processing apparatus according to claim 1, further comprising a pulse width modulator which generates a pulse width modulation signal having a pulse width corresponding to a value of image data, wherein said pulse width modulator functions, based on the image data being output by said output means.

8. An image processing apparatus according to claim 1, further comprising means for recording an image on a recording medium based on the pulse width modulation signal.

9. An image processing apparatus according to claim 8, wherein said recording means records the image on the recording medium by electrophotographic recording.

10. An image processing apparatus provided with input means to input multi-valued image data, a first signal generating means to generate a first image signal based on the data input by said input means, addition means to add a plural number of multi-valued image data input by said input means, a second signal generating means to generate a second image signal based on the data added by said addition means, detection means to detect whether or not the preset data are included in said plural number of multi-valued image data, and a selection means to select either the first or the second image signal according to the result of detection by said detection means.

11. An image processing apparatus according to claim 10, wherein said selection means selects the first image signal in an area corresponding to said plural number of multi-valued image data, when preset data are included in said plural number of multi-valued image data and selects the second image signal in the area corresponding to said plural number of multi-valued image data when present data are not included in said plural number of multi-valued image data.

12. An image processing apparatus according to claim 10, further comprising means for recording an image on a recording medium based on a selected image signal.

13. An image processing apparatus according to claim 12, wherein said recording means records the image on the recording medium by electrophotographic recording.

14. A method to communicate image data which represent an image where an area having intermediate tone density and an area having no intermediate tone density are mixedly present, wherein, using a communication line to communicate image data of n (n is an integral number larger than 3) bits for one pixel, such image data are transmitted so that when n−1 bits among the n bits are at a preset value, the value of the remaining one bit represents a binary level of the pixel in question and when the n−1 bits are not at the preset value, the value of the n bits represent the density of the pixel.

15. The method according to claim 14, wherein a plural number of n-bit image data are gathered into one group and when n−1 bits of all image data in the group are not at a preset value, the image data in the group are added together.

16. An image processing apparatus according to claim 14, further comprising the step of performing recording based on image data communicated.

17. An image processing apparatus according to claim 16, wherein, in said recording step, the image is recorded on the recording medium by electrophotographic recording.

18. An image processing apparatus comprising:

input means for inputting first multi-valued pixel data representing a gradation for a small pixel;

sum means for summing the first multi-valued pixel data for a plurality of small pixels adjoining each other;

means for outputting the summed first multi-valued pixel data as second multi-valued pixel data representing a gradation for one large pixel corresponding to the plurality of small pixels adjoining each other;

selection means to select either the first multi-valued pixel data input by said input means or the second multi-valued pixel data, wherein said output means outputs the multi-valued pixel data selected by the selection means; and switching means capable of switching a mode of selection by said selection means at each page.

19. An image processing apparatus according to claim 18, wherein said input means inputs a selection signal together with the first multi-valued pixel data and said selection means switches over a mode of selection at each pixel, based on the selection signal.

20. An image processing apparatus according to claim 18, wherein said input means inputs the first multi-valued pixel data transmitted in synchronization with the first clock signal, wherein said apparatus further comprises a frequency dividing circuit which divides a first clock signal and generates a second clock signal, and wherein said output means outputs the multi-valued pixel data in synchronization with either the first clock signal or the second clock signal, corresponding to a mode of selection of said selection means.

21. An image processing apparatus according to claim 15, further comprising a pulse width modulator circuit which generates a pulse width modulation signal having a pulse width corresponding to the selected multi-valued pixel data output by said output means.

22. An image processing apparatus according to claim 21, further comprising means for printing an image in accordance with the pulse width modulation signal output from said pulse width modulator circuit.

23. An image processing apparatus according to claim 18, further comprising means for printing an image in accordance with the selected multi-valued pixel data output from said outputting means.

24. An image processing apparatus according to claim 23, wherein said printing means prints an image using a electrophotographic system.

25. An image processing apparatus according to claim 21, wherein said pulse width modulator circuit comprises a first pulse width modulator which generates a pulse width modulation signal having a pulse width corresponding to the first multi-valued pixel data, and a second pulse width modulator which generates a pulse width modulation signal having a pulse width corresponding to a second multi-valued pixel data.

26. An image processing apparatus comprising:
input means for inputting first image data in a first resolution representation;
converting means for converting the input first image data in the first resolution representation into second image data in a second resolution representation, said second resolution being lower than the first resolution; and
means for outputting the second image data,
wherein said converting means further comprises means for summing the input first image data in the first resolution representation for a plurality of pixels adjoining each other to obtain the second image data in the second resolution representation for one pixel.

27. An image processing apparatus according to claim 26, wherein said input means enters the first image data transmitted in synchronization with a first clock signal, wherein said apparatus further comprises a frequency divider circuit which divides the first clock signal and generates a second clock signal, and wherein said outputting means outputs the second image data in synchronization with the second clock signal.

28. An image processing apparatus according to claim 26, further comprising a pulse width modulator which generates a pulse width modulation signal having a pulse width corresponding to the second image data output by said outputting means.

29. An image processing apparatus according to claim 28, further comprising means for printing an image in accordance with the pulse width modulation signal output from said pulse width modulator.

30. An image processing apparatus according to claim 26, further comprising means for printing an image in accordance with the second image data output by said outputting means.

31. An image processing apparatus according to claim 30, wherein said printing means prints an image using a electrophotographic system.

32. An image processing apparatus according to claim 26, further comprising selection means to select either the first image data input by said input means or the second image data, and wherein said outputting means outputs the image data selected by said selection means.

33. An image processing apparatus according to claim 32, further comprising manual switching means capable of switching a mode of selection used by said selection means.

34. An image processing apparatus according to claim 32, wherein said input means also inputs a selection signal and said selection means switches over the mode of selection, based on the selection signal.

35. An image processing apparatus according to claim 32, wherein said input means inputs the first image data transmitted in synchronization with a first clock signal, wherein said apparatus further comprises a frequency dividing circuit which divides the first clock signal and generates a second clock signal, and wherein said outputting means outputs the image data in synchronization with either the first clock signal or the second clock signal, corresponding to a mode of selection of said selection means.

36. An image processing apparatus according to claim 32, further comprising a first pulse width modulator which generates a pulse width modulation signal having a pulse width corresponding to the first image data, and a second pulse width modulator which generates a pulse width modulation signal having a pulse width corresponding to the second image data.

* * * * *

UNITED STATES PATENT AND TRADEMARK OFFICE
CERTIFICATE OF CORRECTION

PATENT NO. : 5,386,302
DATED : January 31, 1995
INVENTOR(S) : ATSUSHI KASHIHARA, ET AL.

It is certified that error appears in the above-identified patent and that said Letters Patent is hereby corrected as shown below:

COLUMN 1

Line 16, "system" should read --systems--.
    Line 18, "apparatus" should read --apparatuses--.

COLUMN 2

Line 45, "illustrate" should read --illustrates--.

COLUMN 3

Line 7, "which" should read --with--.
    Line 12, "made" should read --made to--.
    Line 37, "read-out" should read --read out--.
    Line 39, "read-out" should read --read out--.
    Line 42, "read-out" should read --read out--.
    Line 43, "read-out" should read --read out--.

COLUMN 4

Line 8, "Next" should read --Next,--.
    Line 22, "Coming back" should read --Referring to--.

COLUMN 5

Line 6, "However" should read --However,--.
    Line 28, "Here" should read --Here,--.
    Line 50, "Thus" should read --Thus,--.

UNITED STATES PATENT AND TRADEMARK OFFICE
CERTIFICATE OF CORRECTION

PATENT NO. : 5,386,302
DATED : January 31, 1995
INVENTOR(S) : ATSUSHI KASHIHARA, ET AL.

It is certified that error appears in the above-identified patent and that said Letters Patent is hereby corrected as shown below:

COLUMN 6

Line 3, "However" should read --However,--.
  Line 12, "is" should be deleted.
  Line 13, "maybe" should read --may be--.
  Line 16, "selector" should read --selector 4--.
  Line 27, "composition" should read --composition,--.

COLUMN 8

Line 53, "However" should read --However,--.

COLUMN 10

Line 54, "Therefore" should read --Therefore,--.

COLUMN 11

Line 3, "second" should read --a second--.

COLUMN 13

Line 27, "a" should read --an--.

UNITED STATES PATENT AND TRADEMARK OFFICE
CERTIFICATE OF CORRECTION

PATENT NO. : 5,386,302
DATED : January 31, 1995
INVENTOR(S) : ATSUSHI KASHIHARA, ET AL.

It is certified that error appears in the above-identified patent and that said Letters Patent is hereby corrected as shown below:

COLUMN 14

Line 22, "a" should read --an--.

Signed and Sealed this

Thirtieth Day of May, 1995

Attest:

BRUCE LEHMAN

*Attesting Officer*      *Commissioner of Patents and Trademarks*